(12) United States Patent
Lundy et al.

(10) Patent No.: US 8,422,997 B1
(45) Date of Patent: Apr. 16, 2013

(54) VISUAL VOICE MAILBOX

(75) Inventors: Michael T. Lundy, Olathe, KS (US);
Kristen Elizabeth Miller, Olathe, KS (US); Teresa Marie Meseke, Shawnee, KS (US); Clyde Cornelius Heppner, Liberty, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 639 days.

(21) Appl. No.: 12/266,068

(22) Filed: Nov. 6, 2008

(51) Int. Cl.
*H04M 11/10* (2006.01)
*H04M 1/24* (2006.01)
*H04M 3/08* (2006.01)
*H04M 3/22* (2006.01)

(52) U.S. Cl.
USPC .......................................... 455/413; 379/1.02

(58) Field of Classification Search ............... 455/412.1, 455/412.2, 413; 379/1.02, 88.01, 88.04, 379/88.22, 88.23, 88.25, 88.13, 88.14
See application file for complete search history.

(56) References Cited

U.S. PATENT DOCUMENTS

| | | | | |
|---|---|---|---|---|
| 6,590,965 | B1 * | 7/2003 | Poole et al. | 379/88.19 |
| 2002/0110226 | A1 * | 8/2002 | Kovales et al. | 379/88.17 |
| 2004/0008827 | A1 * | 1/2004 | Martin et al. | 379/67.1 |
| 2004/0062367 | A1 * | 4/2004 | Fellenstein et al. | 379/88.22 |
| 2007/0066284 | A1 * | 3/2007 | Gatzke et al. | 455/413 |
| 2007/0201626 | A1 * | 8/2007 | Winkler | 379/67.1 |
| 2007/0257916 | A1 * | 11/2007 | Krishnamoorthi | 345/440 |
| 2008/0055264 | A1 * | 3/2008 | Anzures et al. | 345/173 |
| 2008/0207176 | A1 * | 8/2008 | Brackbill et al. | 455/413 |
| 2008/0270560 | A1 * | 10/2008 | Tysowski et al. | 709/207 |
| 2009/0097620 | A1 * | 4/2009 | Kim et al. | 379/88.17 |
| 2010/0098226 | A1 * | 4/2010 | Gupta et al. | 379/88.19 |

OTHER PUBLICATIONS

Visual Voicemail iPhone User Guide Sep. 12, 2008 p. 38-39.
Amendment 5.2 iPhone Bill of Rights http://www.iphonebillofrights.com/2007_10_01_archive.html, 4 pps.

* cited by examiner

*Primary Examiner* — Kent Chang
*Assistant Examiner* — Nathan Brittingham

(57) ABSTRACT

A system and computer-readable media are provided for facilitating playback of voicemails using a mobile device having a display. Furthermore, embodiments of the present invention allow users to customize the grouping of voicemails, and view and play back voicemails according to these groupings. Additionally, users are able to automatically play back subsets of groups of voicemails in an order that is most meaningful to them without having to intervene during playback.

18 Claims, 8 Drawing Sheets

VISUAL VOICE MAILBOX

SUMMARY

Embodiments of the invention are defined by the claims below, not this summary. High-level overviews of embodiments of the invention are provided here for that reason, to provide an overview of the disclosure.

In a first aspect, a set of computer-useable instructions provides a method for facilitating playback of voicemails using a mobile device having a display. The method includes receiving a plurality of voicemails; organizing the plurality of voicemails into a plurality of groups based on a first attribute such that each of the plurality of groups is made up of a set of individual voicemails that is related by the attribute; presenting on the display representations of at least a portion of the plurality of voicemails in accordance with the plurality of groups, thereby enabling a selection to be made to initiate voicemail playback; receiving an indication of a desire to play back at least a subset of at least one group of voicemails, wherein the subset of voicemails is made up of one or more voicemails that share a second attribute; and automatically playing the subset of voicemails such that each of the one or more voicemails are played back without user intervention.

In a second aspect, a set of computer-usable instructions provides a method for facilitating playback of voicemails using a mobile device having a display. The method includes receiving a plurality of voicemails, wherein each voicemail has accompanying information including at least a sender telephone number and a date of receipt; using the information to associate a subset of the plurality of voicemails with a known sender, wherein the known sender has at least one known telephone number associated with them; presenting on the display representations of at least a portion of the subset of voicemails in accordance with the known sender, thereby enabling a selection to be made to initiate voicemail playback; receiving a request to play a selection of the portion of the plurality of voice messages from the known sender; and automatically playing a selection such that each voicemail in the selection is played back without user intervention.

In a third aspect, a system is provided for facilitating playback of voicemails using a mobile device. The system includes a receiver that receives a plurality of voicemails; a first processor that organizes the plurality of voicemails into a plurality of groups based on a first attribute such that each of the plurality of groups is made up of a set of individual voicemails that is related by the attribute; a display that presents representations of at least a portion of the plurality of voicemails in accordance with the plurality of groups, thereby enabling a selection to be made to initiate voicemail playback; a user input that receives an indication of a desire to play back at least a subset of at least one group of voicemails, wherein the subset of voicemails is made up of one or more voicemails that share a second attribute; and a second processor that automatically plays the subset of voicemails such that each of the one or more voicemails are played back without user intervention.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Embodiments of the present invention provide systems and computer-readable media for facilitating playback of voicemails using a mobile device having a display. Furthermore, embodiments of the present invention allow users to customize the grouping of voicemails and view and play back voicemails according to these groupings. Additionally, users are able to automatically play back subsets of groups of voicemails in an order that is most meaningful to them without having to intervene during playback.

Embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Figure 1:
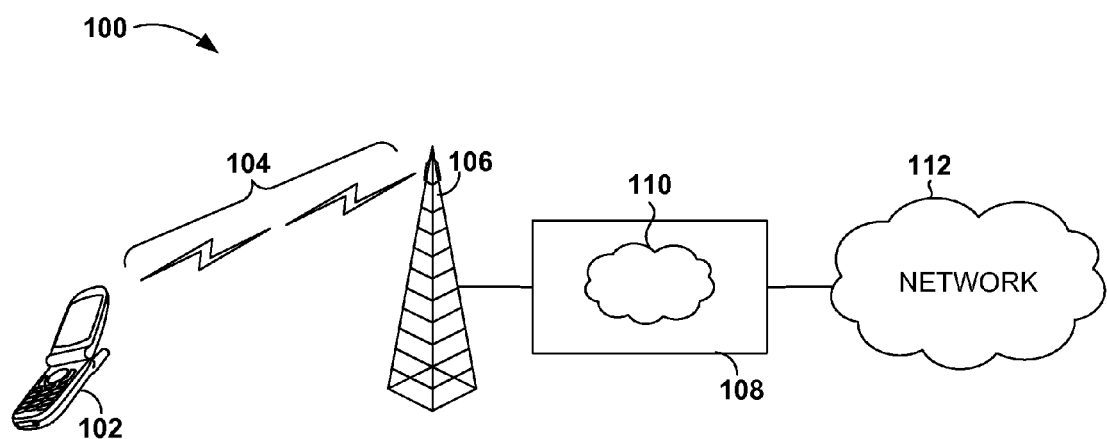
FIG. 1 depicts an operating environment suitable for implementing embodiments of the present invention.

Referring to the drawings in general, and initially to FIG. 1 in particular, an exemplary operating environment suitable for implementing embodiments of the present invention is shown and designated generally as wireless telecommunications environment 100. Wireless telecommunications environment 100 is but one example of a suitable environment and is not intended to suggest any limitation as to the scope of use or functionality of the invention. Neither should the wireless telecommunications environment 100 be interpreted as having any dependency or requirement relating to any one or combination of components illustrated.

With continued reference to FIG. 1 the wireless telecommunications environment 100 contains a mobile device 102, which is in communication 104 with a base station 106. The base station is connected to a voicemail server 108 that contains computer-readable media 110. The voicemail server may be embodied on more than one hardware component in any configuration as known in the art. The voicemail server may also contain or be connected to one or more data storage components (not shown) as known in the art. The voicemail server is connected to a network 112, from which it may receive voicemails. More wireless telecommunication network elements such as switching centers and the like may be present but are not presented here for the sake of clarity.

In one embodiment, voicemail received for the mobile device is stored on the voicemail server, and voicemail alerts are sent to the mobile device when a new voicemail is received. Information included in a voicemail alert may include the sender's telephone number, the date of the message, and the like. In an alternate embodiment, voicemail received for the mobile device is forwarded directly to the mobile device by the voicemail server where it is stored in addition to information such as the sender's telephone number and the like.

Mobile device 102 could be a cell phone, a PDA, a computer, a laptop computer, or some other communications device, capable of communicating wirelessly via a radio access network (RAN) in a licensed spectrum using a format, such as CDMA, TDMA, GSM, 3G, or other acceptable format. In general, the mobile device includes a user interface, a wireless communications interface, a processor, and a data storage component in one embodiment. The user interface may include buttons, a touch screen, a microprocessor, or other elements. The wireless communication interface may comprise an antenna and a chipset for communicating with one or more access nodes over an air interface. The chipset or wireless communication interface, in general, may be able to communicate with a CDMA network, a GSM network, or one or more additional types of wireless networks. The processor and data storage component may be any suitable component known to those of skill in the art.

Base station 106 is a fixed station used for communicating with the mobile device 102. Standard air interface protocols, such as code division multiple access ("CDMA"), global system for mobile-communications ("GSM"), or time division multiple access ("TDMA"), as well as others, may be used by the base station to communicate with the mobile device. Other network communication interface arrangements are also possible. A base station controller (not shown) is responsible for handling traffic and signaling with the mobile device. The base station is shown without their many components, for the sake of clarity. The mobile device could be in simultaneous communication with multiple base stations.

The network 112 may include one or more wide area networks (WANs) and/or one or more local area networks ("LANs"), as well as one or more public networks, such as the Internet, and/or one or more private networks. For instance, the network may include one or more networks providing network services, such as those discussed herein. Packets may be routed in and among the network using protocols, such as the Internet Protocol (IP), and devices in communication within and among the network may be identified by a network address, such as an IP address. Furthermore, the network may include a number of circuit-switched networks, such as the public-switched telephone network ("PSTN"), for example.

Figure 2:
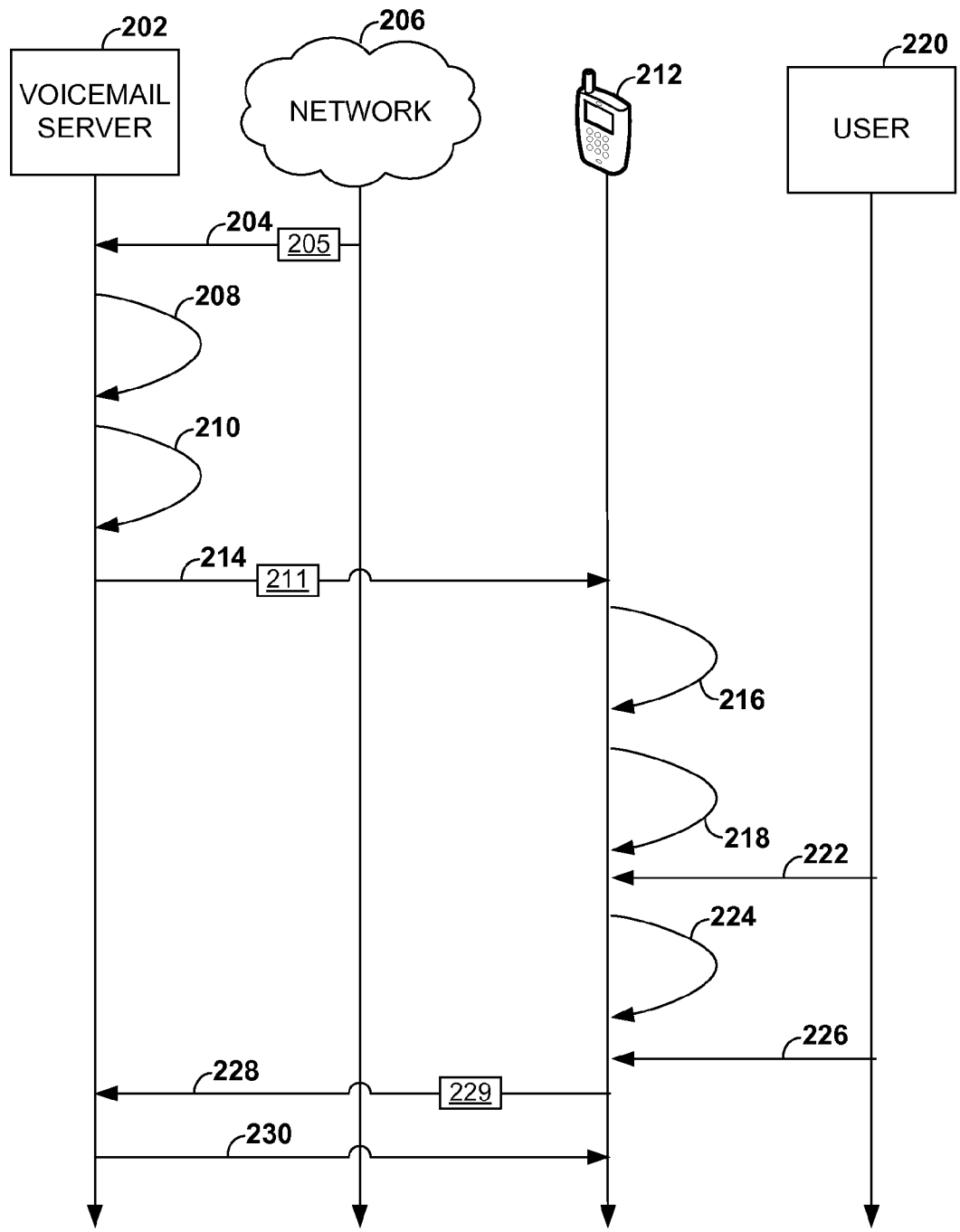
FIG. 2 depicts a diagram illustrating interactions between components of an embodiment of the present invention.

FIG. 2 depicts a diagram illustrating interactions between components of an embodiment of the present invention. In this embodiment, voicemail server 202 receives 204 voicemail 205 from a network 206. The voicemail server 202 stores 208 the voicemail 205 and then generates 210 voicemail alert information 211. Voicemail alert information may include the sender's telephone number, the date of the message, and the like. Once the voicemail alert information has been generated, the voicemail server sends 212 the voicemail alert information 211 to the mobile device 214. When the mobile device 212 receives the voicemail alert information 211 from the voicemail server 202, it utilizes the alert information to organize 216 the voicemail into the appropriate group(s). The groups are defined by predefined voicemail attributes such as sender, date, and other possibly user-defined attributes. Once the voicemail is organized, the mobile device displays 218 summary information for each group. The group summaries may be presented in alphabetic order, chronological order, or any other order that is relevant to the grouping attribute. In an alternate embodiment, the user may choose the order in which the group summaries are displayed.

At this point, a user 220, which may be any user of the mobile device 212, selects 222 a group for which they wish to view voicemails. This selection may be made via the user interface of the mobile device. In an exemplary embodiment, the selection is made with a touch screen. Once the group selection is made, the mobile device presents 224 a list containing summary information for each voicemail belonging to the selected group. The list contains voicemail summary information distinguishing each voicemail. Voicemail summary information may include sender information, an indication of the voicemail being new, the date/time of the voicemail, and other information that may be user defined. The voicemail summaries may be presented in alphabetical order, numerical order, chronological order, or a user-defined order.

Once the voicemails within the group are displayed, the user selects 226 a subset of the voicemails within the displayed group to play back. A subset may include all new voicemails or all voicemails received within a certain date range, for example. The mobile device then forwards 228 a request 229 to play the selected voicemails to the voicemail server 202. The voicemail server 202 automatically plays 230 the selected voicemails in the proper order without requiring the user to intervene.

Figure 3:
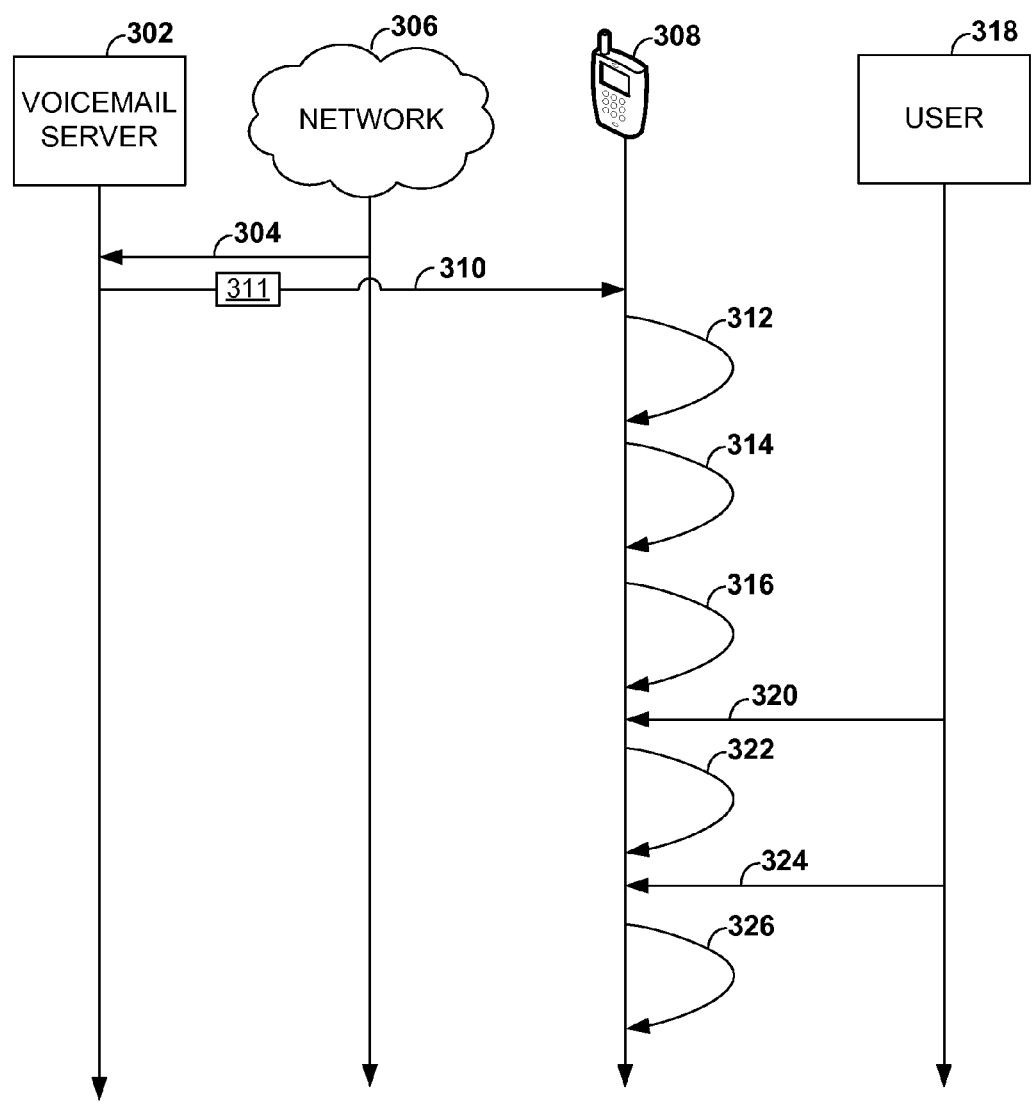
FIG. 3 depicts a diagram illustrating interactions between components of another embodiment of the present invention.

FIG. 3 depicts a diagram illustrating interactions between components of an alternate embodiment of the present invention. In this embodiment, voicemail server 302 receives 304 voicemail 311 from a network 306. The voicemail server 302 then sends 310 the voicemail directly to mobile device 308, which locally stores the voicemail at step 312. The voicemail is then grouped according to a user defined attribute 314. A summary of each group is then presented on the mobile device display 316. As with the previous embodiment, the group summaries may be presented in a particular order. A user 318 selects a group to display 320, and the mobile device presents a list containing summary information for each voicemail in the selected group 322. Again, the voicemail summary information presented in the list may be in any particular order. Once the voicemails within the group are displayed, the user selects at least one subset of the voicemails within the group to play back 324. The selected voicemails are then played automatically in the proper order without requiring user intervention 326.

Figure 4:
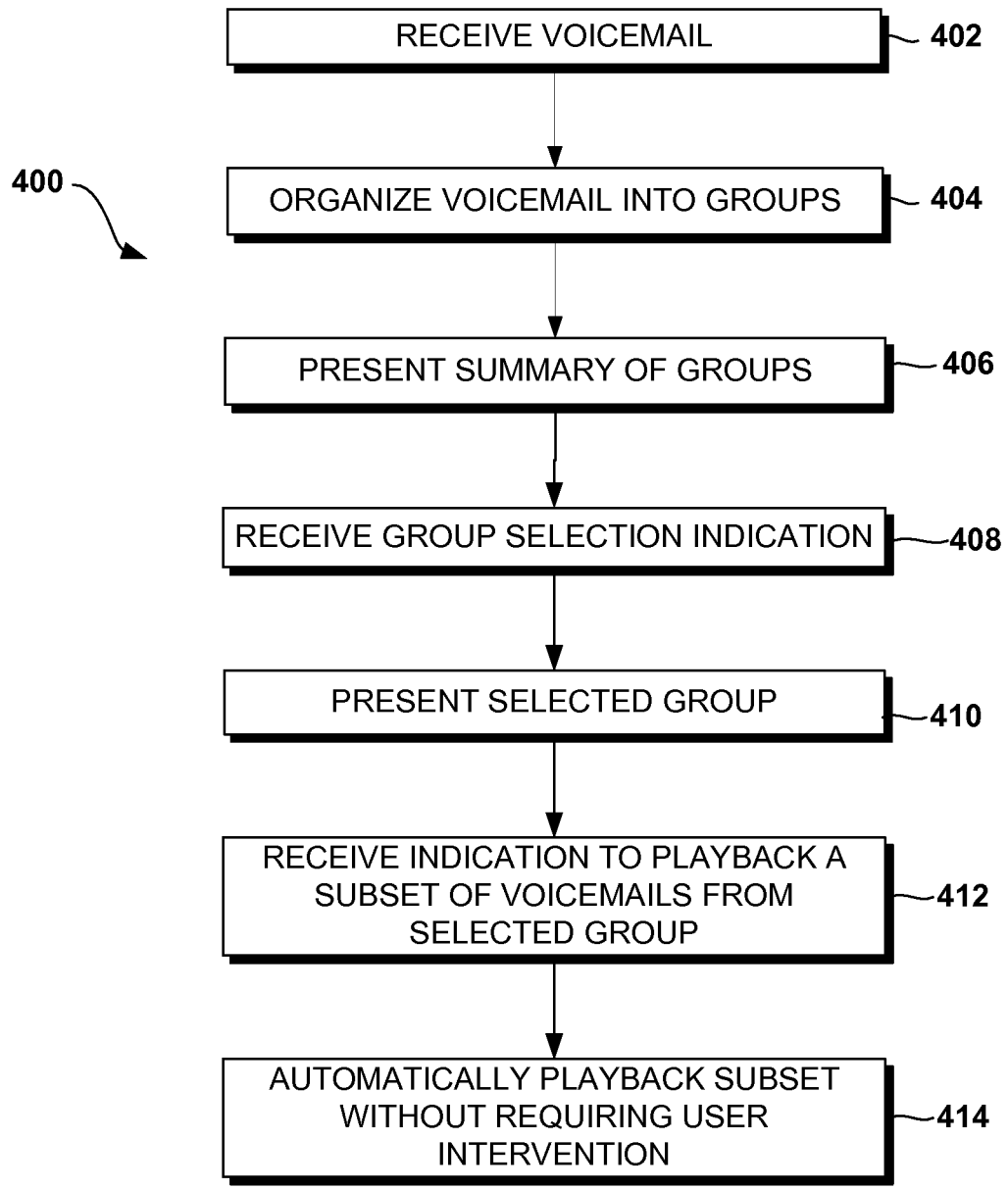
FIG. 4 depicts a flowchart for a method of facilitating playback of voicemails using a mobile device having a display.

FIG. 4 depicts a flowchart for a general overview of a method of facilitating playback of voicemails using a mobile device having a display. The method 400 begins in step 402 when a voicemail is received for the mobile device. When the voicemail is received, it is stored either on the voicemail server or on the mobile device depending on the embodiment. If the voicemail is stored on the voicemail server, then voicemail alert information is sent to the mobile device. In an alternate embodiment, the voicemail is stored directly on the mobile device along with information regarding the voicemail such as the sender's telephone number, the date of the voicemail, and the like. In step 404, the voicemail is organized into a group based on an attribute preferred by the user. It is not meant that the actual voicemails are physically reorganized within the data storage component where they reside, but rather data structures are built around the voicemail that are used for organizational purposes. These data structures are more fully described below in the discussion related to FIG. 5. The attribute(s) used to form the voicemail groupings may be selected by the user or a mobile device default. Examples of potential attributes include the contact from which the voicemail was sent, the date the voicemail was sent, or a user defined grouping such as a subject of the voicemail.

In step 406, a summary of each voicemail group is presented on the display of the mobile device. This voicemail group summary may be presented in response to a user input indicating a desire to view voicemail groups, or the group summary may be displayed in response to receiving a new voicemail. Group summary information may include a grouping-attribute description, the number of messages in the group, and other information that might be relevant to the user. An example of a grouping-attribute description is, if for example, the voicemails are to be grouped by contact, the grouping-attribute description may be the contact name. Depending on the grouping attribute, each voicemail may belong to only one group. In an alternate embodiment, each voicemail may belong to more than one group. As mentioned previously, the group summary information may be presented in a particular order, which may be default or user-defined.

In step 408, an indication of a group selection is received from the user, and the selected group is presented on the mobile device display in step 410. Summary information for each voicemail in the selected group may be presented. The voicemail summary information may vary depending on how the voicemails are grouped, but relevant details such as sender information, indications if the voicemail is new, the date of the voicemail, and the like may be presented. As mentioned previously, the voicemail summary information may be presented in a particular order which may be default or user-defined.

In step 412, an indication to play back all of the voicemails or a subset of voicemails within the displayed group is received from the user. For example, a subset may include all new voicemails or all voicemails received within a certain date range. In step 414, the selected voicemails are played back automatically in the proper order without requiring user intervention. Furthermore, depending on user preferences, typical summary information announced before each voicemail may or may not be played. If the summary information is to be included in the playback, then in one embodiment, the user selects which types of information are to be played before each voicemail is played. For instance, a user may only require that the date of the voicemail be announced before playing the voicemail or a user may require that the date and the sender's phone number be announced. In an alternate embodiment, the information not already indicated by the voicemail grouping is played. For instance, if the voicemails are grouped by contact, then the system could automatically decide not to read out the sender name or number since this is implied by the voicemail grouping.

Figure 5:
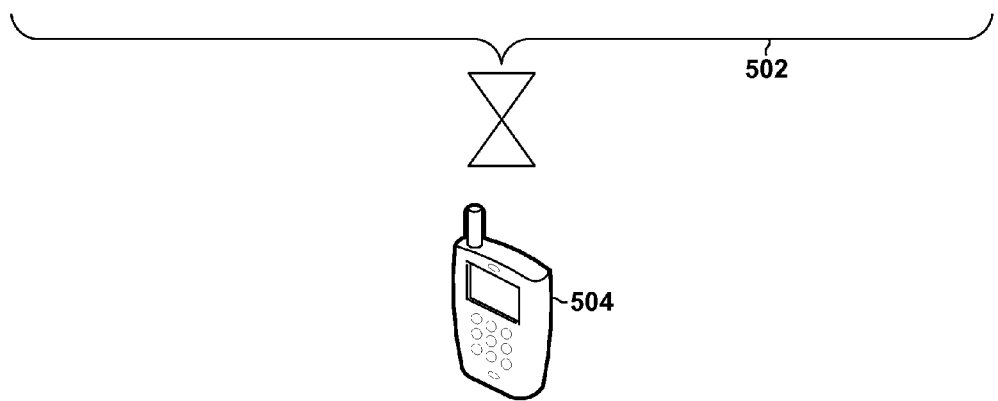
FIG. 5 depicts an embodiment of a data structure used for organizing voicemails and generating mobile device displays.

FIG. 5 depicts an embodiment of a data structure used for organizing voicemails into groups and generating displays to be presented by the mobile device. The data contained in table 502 is used to generate groups of voicemails as well as voicemail summaries depicted in mobile device display 504. The "Voicemail ID" column 506 contains the unique identifiers used to distinguish each voicemail message. Voicemail identifiers may be generated by either the voicemail server or the mobile device depending on the embodiment. The "Contact ID" column 508 contains unique identifiers used to distinguish each contact known to the mobile device. Contact information may be stored in other tables (not shown) in the data storage component of the mobile device. In addition to contact identifiers, other contact information such as the contact name, contact description, a list of telephone numbers associated with each contact and the like may also be stored in the contact information tables (not shown). Since each contact may have more than one telephone number associated with it, the "Contact Number" column 510 identifies which telephone number the contact used to send the voicemail. The "Date/Time" column 512 identifies the date and time that the voicemail was received. The "New" column 514 indicates if the voicemail has been listened to. Additional user-customized information may be stored. For instance, the "Subject" column 516 could provide some indication as to the subject of the voicemail, and in one embodiment, this information is provided via a user-created tag. Other user-defined information (not shown here) could be associated with each voicemail and stored in data table 502.

Table 502 is shown depicting data for illustrative purposes. In row 520, for instance, an indication of a voicemail is shown with a unique voicemail identifier of "VM1" 522. This voicemail was sent by a contact with a unique contact identifier of "C1" 524 from a mobile device associated with "C1" 526. The date/time of the voicemail 528, an indication that the voicemail is not new 530, and a voicemail subject 532 are also stored. In row 534, a voicemail was sent by an unknown sender. Unknown senders may be defined as senders for which there is no associated contact information. In this embodiment, the "Contact ID" field has been left blank 536 as well as the "Contact Number" field 538. Additionally, no subject has been associated with this voicemail, so that field has been left blank as well 540. In row 542, a voicemail has been received with an indication that the voicemail is new 544. In this embodiment, this indication is given by a value of 'Y' for indicating that the voicemail is new and 'N' for indicating that the voicemail is not new. Other examples of potential embodiments of such indications include 'true' or 'false,' '1' or '0,' or any other such suitable indication as known in the art.

Figure 6:
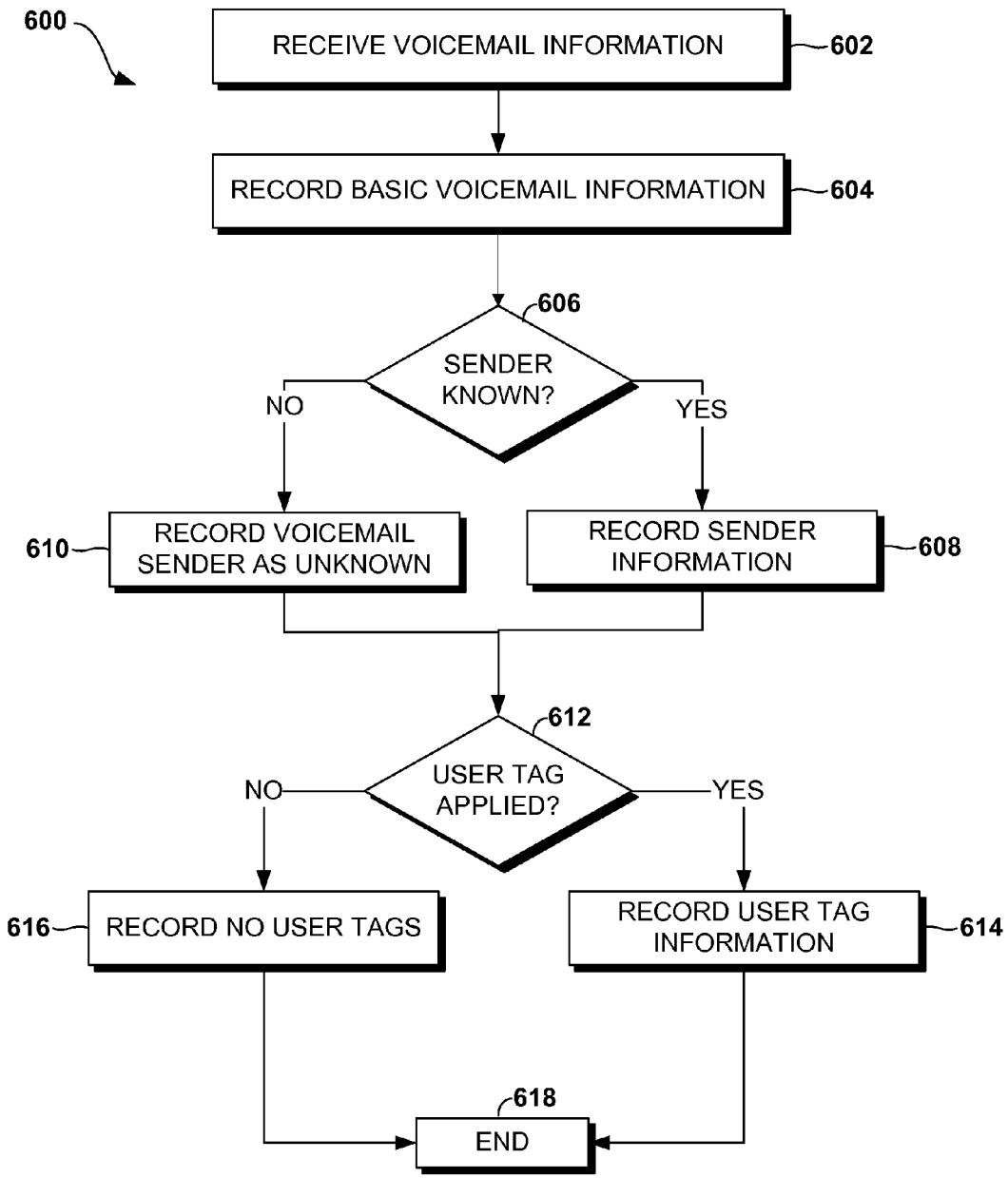
FIG. 6 depicts a flowchart for a method of facilitating playback of voicemails using a mobile device having a display.

FIG. 6 depicts a flowchart for a method of updating the data structure depicted in FIG. 5 when a new voicemail is received. The method 600 begins when a new voicemail is received, and the mobile device receives the voicemail information in step 602. In step 604, the basic voicemail information is recorded in the voicemail organization data structure. Basic voicemail information may include the voicemail identifier, the date the message was sent, an indication as to whether the voicemail is new, and other basic voicemail information. In step 606, it is determined if the sender of the voicemail is known. This may be accomplished by referencing the sender's telephone numbers against a set of telephone numbers of known contacts that is stored in the mobile device. If the sender is known, the contact identifier and the contact number may be stored (608). For example, if the sender is unknown (610), then this may also be indicated in the data structure by leaving these fields blank.

In step 612, the system determines if a user tag has been applied. A user tag may be any piece of information that the user wishes to associate with the message. In one embodiment, a user tag is a voicemail subject. User tags are optional and merely provide additional ways to customize the grouping and/or ordering of voicemails to ensure maximal usefulness for the user. If a user tag has been applied, this information is recorded (614) in the data structure. In one embodiment, a user tag is manually applied by the user when a voicemail indication is received by the mobile device. In another embodiment, a user tag is manually applied by the user after the voicemail has been listened to. If no user tag has been applied, no data need be recorded (616). In step 618, the voicemail data structure update is complete.

Figure 7:
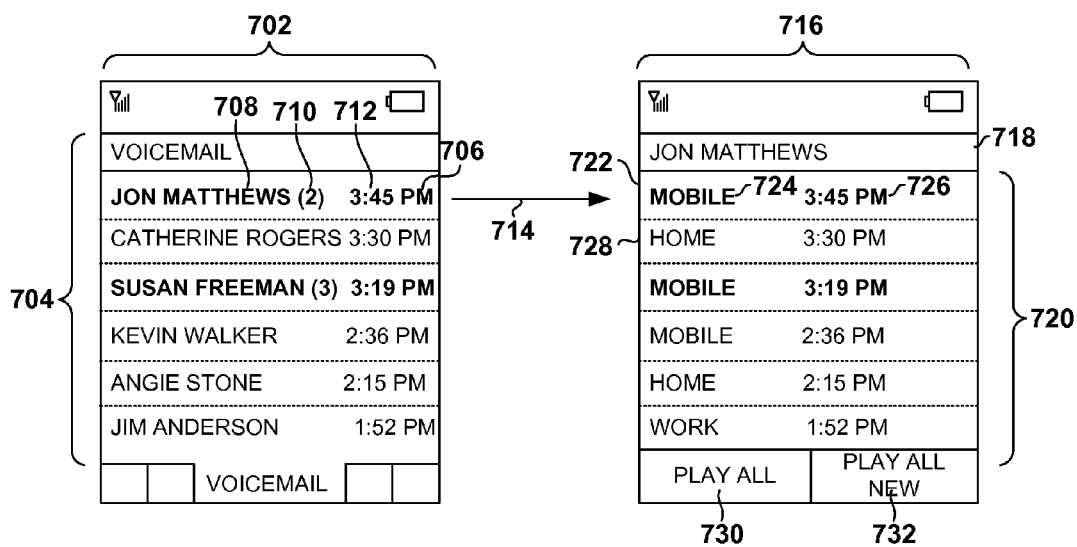
FIG. 7 depicts screenshots of a mobile device display for an embodiment of the present invention.

FIG. 7 depicts screenshots of a mobile device display for an embodiment of the present invention. These displays may be generated by utilizing data stored in data structures similar to that disclosed in FIG. 5. Screen 702 displays voicemail group summaries 704. In this embodiment, the voicemails are grouped by contact, and the group summary information shown is the contact name, the number of new messages, and the time of the last message. For example, the first group 706 consists of voicemails sent by "Jon Matthews" 708 who has left two new messages 710, the last of which was left at 3:45 PM 712. When the user selects the "Jon Matthews" group 714, the mobile device presents a screen 716 that presents information for each voicemail in the group. At the top of the screen, a display bar gives group information 718. In this example, only the contact name is displayed. Beneath the display bar, the list of voicemails within the voicemail group are presented 720. Additionally, the voicemails contained in this group are presented in chronological order. In an alternate embodiment, the new voicemails are presented first.

In the first row of the voicemail summary list 722, summary information on the last voicemail sent by Jon Matthews is given. In this embodiment, the voicemail summary information includes an indication the voicemail was sent by Jon Matthews's mobile device 724 at 3:45 p.m. 726. Note that in this embodiment, new messages are indicated by being in bold as in row 722 while messages that have already been listened to are not bold such as in row 728. The inventors envision many other ways to indicate if a message is new that may include showing an icon, making the text of the voicemail summary of a new message a different color, and the like. At the bottom of the screen, buttons indicating a user's playback options are depicted. A "Play All" button 730 may play back all voicemails within the group, or if the user has selected a subset of voicemails within the group, the "Play All" button may play back all voicemails within the subset. The "Play All New" button 732 may play back all voicemails within the group that the user has not yet listened to.

Figure 8:
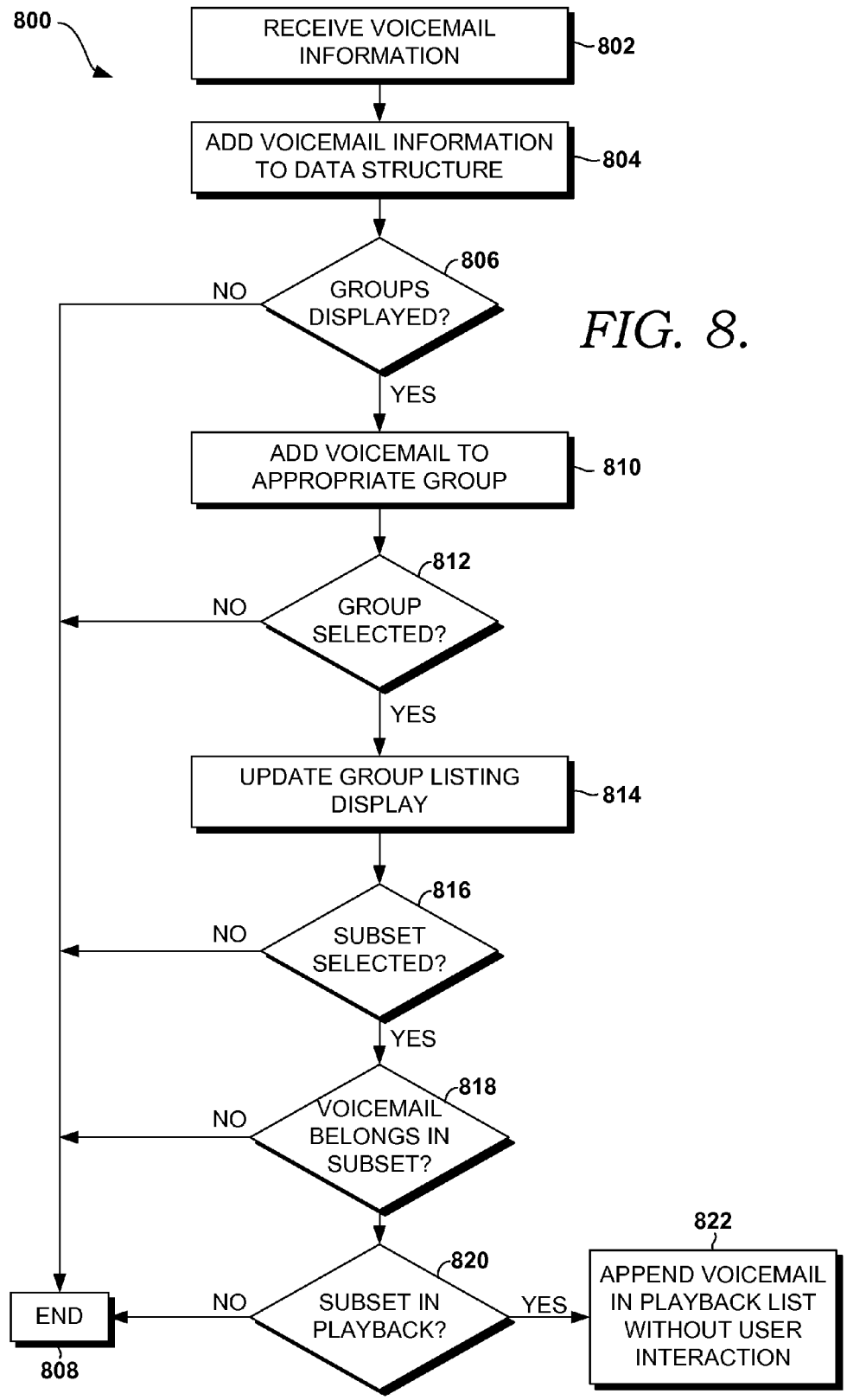
FIG. 8 depicts a flowchart for a method of facilitating playback of voicemails using a mobile device having a display.

FIG. 8 depicts a flowchart for a method of dynamically updating a voicemail playback list when a new message is received. The method 800 begins when a new voicemail is received for the mobile device and either the voicemail alert information is sent to the mobile device or the voicemail itself is sent to the mobile device for storage in addition to the voicemail information, depending on the embodiment, in step 802. In step 804, the voicemail information is added to the voicemail data structure as described previously in reference to FIG. 6. In step 806, the system determines if voicemail group summary information is currently being presented to the user. If not, the system will idle until the next user input (808). If the group summary information is being presented, then the voicemail will be added to the appropriate grouping in step 810, and if the group summary information is being displayed, it will be updated if applicable. Next the system will determine if a group has been selected (812) and if no group has been selected, then the system will idle until the next user input (808). If a group has been selected, then the new voicemail summary information will be added to the group listing display in step 814. Next, if a subset of voicemails within the group has been selected in step 816, then the system will determine if the voicemail belongs to the subset in step 818. Subsets may be selected via the mobile device inputs such as a touch screen if applicable. If no subset is selected in step 816 or if the voicemail does not belong in the subset (818) then the system will not do any more processing regarding the new voicemail (808). Returning to step 818, if the voicemail does belong in the subset, then the system determines if the subset if currently in playback (820). If the subset is not in playback, then the system idles until the next input (808). If the subset is in playback, then the voicemail is appended to the playback list in step 822.

In an alternate embodiment, voicemail playback lists are not updated dynamically. In this case, only the group summary displays or voicemail list display may be updated when a new voicemail is received.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more non-transitory, computer-readable media having computer-useable instructions embodied thereon for performing a method for facilitating playback of voicemails using a mobile device having a display, the method comprising: receiving a plurality of voicemail alerts from a voicemail server located in a wireless telecommunications environment, wherein each voicemail alert has accompanying information including at least a sender telephone number and a date of receipt; using the information to associate a collection of the plurality of voicemail alerts with a known sender, wherein the known sender has at least one known telephone number associated with the known sender; presenting on the display, representations of at least a portion of the collection of voicemail alerts in accordance with the known sender, thereby enabling a selection to be made to initiate voicemail playback; receiving user input indicating that voicemails associated with a selection of the portion of the collection of voicemail alerts are to be played, wherein each of the voicemails corresponds to a particular voicemail alert, and wherein the voicemails are stored on the voicemail server; receiving user input indicating a desired order in which to play the voicemails associated with a selection of the portion of the collection of voicemail alerts; forwarding a request to the voicemail server to automatically play the voicemails associated with the selection such that each voicemail is played back consecutively in the desired order and without user intervention and wherein the information not already indicated by the selection of the portion of the collection is audibly announced before playing each voicemail.

2. The media of claim 1, wherein the representations of at least a portion of the collection of voicemail alerts are presented in a user-defined order.

3. The media of claim 1, wherein the portion of the collection of voicemail alerts is defined by a common voicemail subject that each voicemail alert in the portion shares.

4. The media of claim 1, wherein the selection of voicemail alerts is defined by a user-defined date range, wherein each voicemail alert in the selection has a voicemail date falling within the range.

5. The media of claim 1, wherein the selection of voicemail alerts is made up of all new voicemail alerts within the subset of voicemail alerts.

6. The media of claim 1, wherein the selection of voicemail alerts is user defined.

7. A system for facilitating playback of voicemails using a mobile device, the system comprising:
   a receiver that receives a plurality of voicemails;
   a first processor that organizes the plurality of voicemails into a plurality of groups based on a first attribute such that each of the plurality of groups is made up of a set of individual voicemails that is related by the attribute;
   a display that presents representations of at least a portion of the plurality of voicemails in accordance with the plurality of groups, thereby enabling a selection to be made to initiate voicemail playback;
   a user input that receives an indication of a desire to play back at least a subset of at least one group of voicemails, wherein the subset of voicemails is made up of one or more voicemails that share a second attribute; and
   a second processor that automatically plays the subset of voicemails such that each of the one or more voicemails are played back without user intervention, wherein the second processor causes only the information not already indicated by the grouping of the subset of voicemails to be audibly announced before playing each voicemail.

8. The system of claim 7, wherein the first processor is located on a network element of a wireless telecommunications network.

9. The system of claim 7, wherein the first processor and the second processor are combined into a single processor.

10. The system of claim 9, wherein the single processor is located in the mobile device.

11. The system of claim 7, wherein the display is a touch screen on the mobile device and the user input is also the touch screen.

12. One or more non-transitory, computer-readable media having computer-useable instructions embodied thereon for performing a method for facilitating playback of voicemails using a mobile device having a display, the method comprising: receiving a plurality of voicemails; organizing the plurality of voicemails into a plurality of groups based on a first attribute such that each of the plurality of groups is made up of a set of individual voicemails that is related by the attribute; presenting on the display representations of at least a portion of the plurality of voicemails in accordance with the plurality of groups, thereby enabling a selection to be made to initiate voicemail playback; receiving an indication of a desire to play back at least a subset of at least one group of voicemails, wherein the subset of voicemails is made up of one or more voicemails that share a second attribute; and automatically playing the subset of voicemails such that each voicemail is played back without user intervention, and wherein only the information not already indicated by the grouping of the subset of voicemails is audibly announced before playing each voicemail.

13. The media of claim 12, wherein the first attribute is a known sender having at least one known telephone number associated with the known sender.

14. The media of claim 12, wherein the first attribute is a voicemail subject, wherein each voicemail has an associated voicemail subject, which describes the content of the voicemail.

15. The media of claim 12, wherein the subset is comprised of voicemails received within a user-defined period of time.

16. The media of claim 12, wherein the subset is comprised of new voicemails.

17. The media of claim 12, wherein the second attribute is user defined.

18. The media of claim 12, wherein the subset of voicemails is updated dynamically when a new voicemail is received.

* * * * *